United States Patent
Mueller-Fiedler et al.

[11] Patent Number: 5,898,803
[45] Date of Patent: Apr. 27, 1999

[54] OPTICAL, BEAM-SPLITTING COMPONENT AND A METHOD FOR PRODUCING A PRISM CARRIER PLATE FOR SUCH A COMPONENT

[75] Inventors: Roland Mueller-Fiedler, Leonberg; Klaus-Michael Mayer, Gerlingen; Wolf-Henning Rech, Leonberg; Heiner Hauer, Fellbach; Albrecht Kuke, Auenwald; Thomas Schwander, Backnang, all of Germany

[73] Assignee: Robert Bosch GmbH, Stuttgart, Germany

[21] Appl. No.: 08/843,083

[22] Filed: Apr. 25, 1997

[30] Foreign Application Priority Data

Apr. 27, 1996 [DE] Germany .............. 196 16 932

[51] Int. Cl.$^6$ ........................................ G02B 6/34
[52] U.S. Cl. ................. 385/36; 385/14; 385/31; 385/47
[58] Field of Search ................. 385/14, 31, 36, 385/42, 88, 89, 47, 49, 129, 130

[56] References Cited

U.S. PATENT DOCUMENTS

| | | | |
|---|---|---|---|
| 4,057,719 | 11/1977 | Lewis | 385/25 X |
| 4,173,390 | 11/1979 | Kach | 385/33 X |
| 4,995,694 | 2/1991 | Rieger et al. | 385/36 X |
| 5,073,003 | 12/1991 | Clark | 385/33 |
| 5,170,448 | 12/1992 | Ackley et al. | 385/31 X |
| 5,440,655 | 8/1995 | Kaplow et al. | 385/25 |
| 5,757,994 | 5/1998 | Schoenwald et al. | 385/44 |

FOREIGN PATENT DOCUMENTS 0 192 850   9/1986   European Pat. Off. ............. 385/31 X

*Primary Examiner*—Brian Healy
*Attorney, Agent, or Firm*—Kenyon & Kenyon

[57] ABSTRACT

An optical, beam-splitting component has a prism carrier plate which supports a prism member upon which a deflecting layer is applied. At the same time, the prism member juts into a groove between two optical waveguides carrying the light signals.

16 Claims, 3 Drawing Sheets

OPTICAL, BEAM-SPLITTING COMPONENT AND A METHOD FOR PRODUCING A PRISM CARRIER PLATE FOR SUCH A COMPONENT

BACKGROUND INFORMATION

U.S. Pat. No. 5,170,448 describes an integrated, optical arrangement with a waveguide. A V-groove is configured in the region of the waveguide.

European Patent No. EP 0 192 850 Al describes a monolithically integrated arrangement in which waveguides and photo detectors are produced directly on the semiconductor substrate.

SUMMARY OF THE INVENTION

The optical, beam-splitting component according to the present invention has the advantage that it can be produced particularly cost-effectively with little expenditure of time and energy. Furthermore, the prism member is able to be produced very easily and allows simple mounting and alignment of the deflecting layer.

If the optical waveguides are supported by means of an optical-waveguide supporting plate, the mechanical stability, and thus the reliability of the optical, beam-splitting component, increases. In addition, the method for producing the optical, beam-splitting component is simplified since, first of all, an alignment of the optical waveguides can be carried out by means of the optical-waveguide supporting plate and, secondly, the possibility is provided of aligning the prism member with respect to the optical waveguides.

If the optical-waveguide supporting plate has at least one alignment groove for the optical waveguides, the extra work for alignment is reduced, since, because of this, no active alignment techniques are necessary.

In the same way, a passive alignment of the prism carrier plate can be achieved with respect to the optical-waveguide supporting plate by means of alignment elements on the prism carrier plate and counter-alignment elements on the optical-waveguide supporting plate, whereby the prism member is also automatically aligned relative to the optical waveguides. No active alignment technique is necessary here either.

The embodiment of the alignment element in the shape of a roof ridge represents an advantageous measure, inasmuch as this shape comprises a particularly exact self-alignment effect and is able to be produced by anisotropic etching.

The arrangement of an optical detector in the reflection area of the deflecting layer yields an advantageous application field for the optical, beam-splitting component, since the component is thus usable, for example, as a transmit-receive component.

If the optical detector is arranged on the side of the optical-waveguide supporting plate opposite the optical waveguides, a photo lithographic patterning to produce conducting tracks is possible particularly easily here.

If the prism carrier plate has at least one alignment element, it brings with it the advantage of being suitable for a passive alignment on a body having counter-alignment elements.

In addition, the selection of the roof-ridge shape for the alignment element represents an advantage since, first of all, the shape of a roof ridge is particularly simple to produce and, secondly, it has an especially precise self-alignment effect.

The method according to the present invention for producing a prism carrier plate is advantageous because, first of all, a material can be selected for the plate-shaped base which can be worked particularly well regardless of its optical properties and, secondly, by using the plate-shaped base as a master pattern, a high number of sub-master patterns can be produced as prism carrier plates by a substantially simpler and more cost-effective shaping method than the master pattern.

By producing the depression, shaped like an inverse prism, by means of anisotropic etching, the natural inclined formation of the flanks of crystalline materials can be utilized for the formation of inclined planes for the prism member to be produced.

Production of the prism carrier plate in the 3rd generation represents an advantageous optimum of a compromise between mass production of the prism carrier plate and the accuracy during its shaping.

The manufacture from metal of an intermediate auxiliary plate, produced in the 1st generation, which includes a vapor-deposited metallic layer and an electroplated layer, is, first of all, very cost-saving, and secondly, very exact as far as the shaping is concerned, so that it is possible to attain great accuracy for the prism carrier plates to be shaped therefrom.

DETAILED DESCRIPTION

Figure 1:
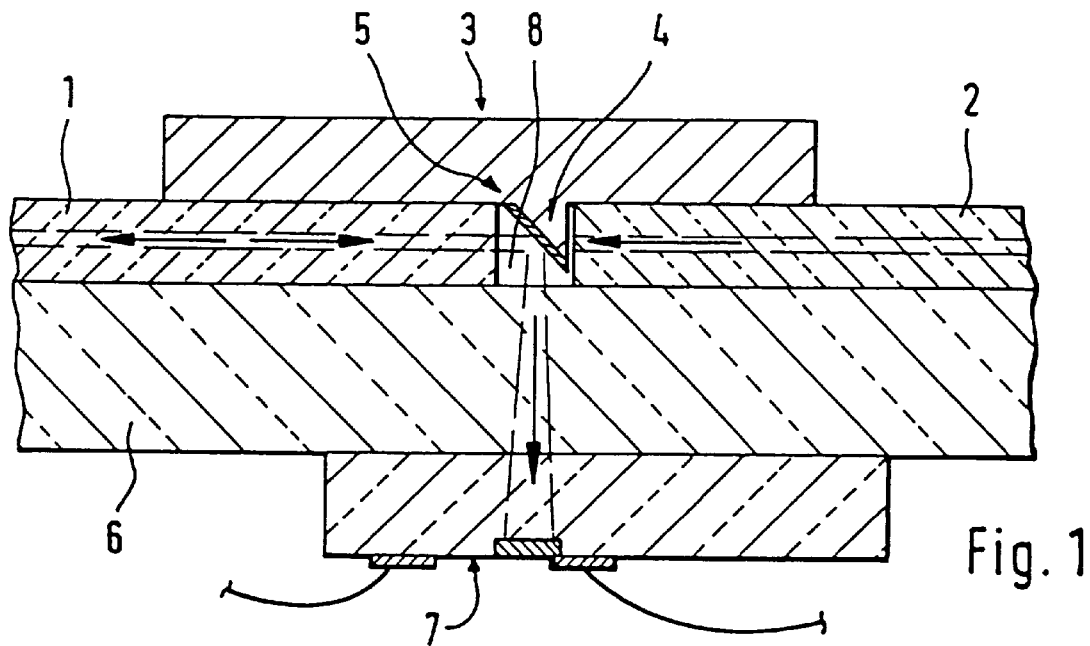
FIG. 1 shows a cross-section through a schematic representation of a first exemplary embodiment for an optical, beam-splitting component.

In FIG. 1, a first optical waveguide 1 is arranged in alignment with a second optical waveguide 2 on an optical-waveguide supporting plate 6. The two optical waveguides 1, 2 are realized in the form of glass fibers and have a cut-out 8 between their end faces. Mounted on optical waveguides 1, 2, a prism carrier plate 3 is provided on whose bottom side a prism member 4 is arranged which juts into cut-out 8. Light signals are carried in optical waveguides 1, 2. In this example, prism member 4 has a triangular cross-section, the hypotenuse of the triangle lying in an inclined plane upon which a deflecting layer 5 is applied. Deflecting layer 5 is inclined toward the direction of propagation of the light signals. An optical detector 7, whose active zone is configured approximately at right angles below prism member 4, is arranged below optical-waveguide supporting plate 6.

By way of example, two light signals having different wavelengths are indicated here, light of the wavelength $\lambda=1.310$ nanometers in the second optical waveguide being carried in the direction of prism member 4. In addition, light of the wavelength $\lambda=1.550$ nanometers is conveyed in the first optical waveguide 1 toward prism member 4. The light signal having the wavelength $\lambda=1.550$ nanometers reaches deflecting layer 5 which deflects the light path of the light signal, and specifically, in the form that the deflected light signal falls on the active zone of optical detector 7. In so doing, the light signal deflected at the deflecting layer 5 penetrates optical-waveguide supporting plate 6 which, at least for this light-wave range, must be transparent. The light signal having the wavelength λ=1.310 nanometers penetrates prism member 4, which is transparent at least for this wavelength range, as well as deflecting layer 5, and thus, in continuation of its original light path, arrives in first optical waveguide 1.

Therefore, the optical, beam-splitting component, shown only schematically here, is capable of handling light signals of different wavelengths separately from one another, in that they are selectively either transmitted or reflected at deflecting layer 5. For example, the light signal having the light-wave length λ=1.550 nanometers is a received, modulated light signal, while the light signal having the light-wave length λ=1.310 nanometers is a still unmodulated transmission signal.

Figure 2:
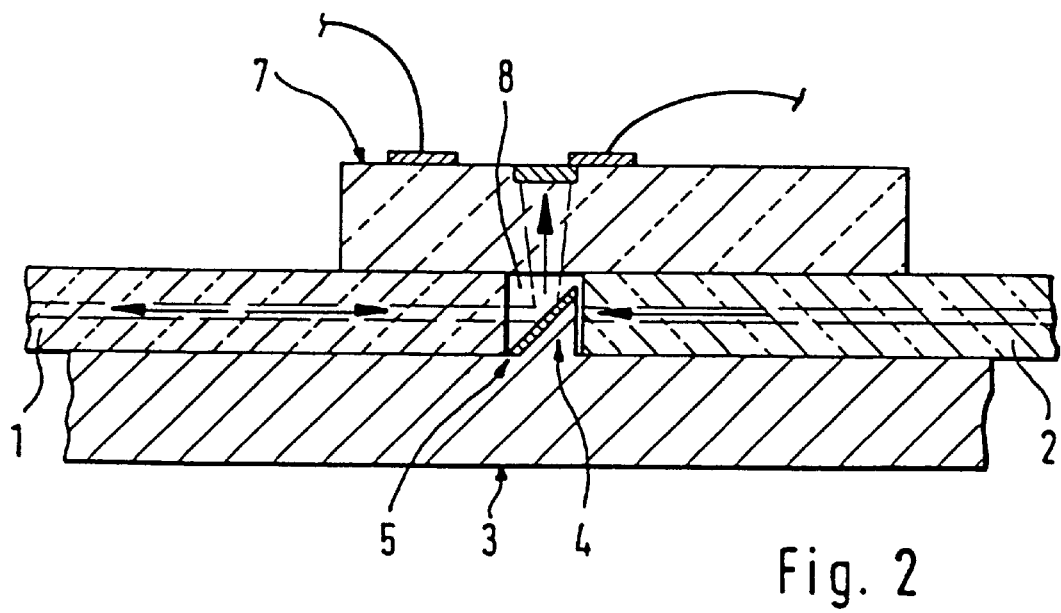
FIG. 2 shows a cross-section through a schematic representation of a second exemplary embodiment of an optical, beam-splitting component.

Another exemplary embodiment is shown schematically in FIG. 2. It differs from the representation shown in FIG. 1 due to the following points: Optical waveguides 1, 2 are no longer supported on an optical-waveguide supporting plate 6, but rather are joined directly to prism carrier plate 3. Accordingly, optical detector 7 is brought directly up to optical waveguides 1, 2 and joined to them.

In this example, the light signal having the light-wave length λ=1.550 nanometers must cover a shorter path to optical detector 7 and, in so doing, is less strongly expanded. Because of this, this arrangement is particularly suitable for photo detectors having smaller surfaces.

Figure 3:
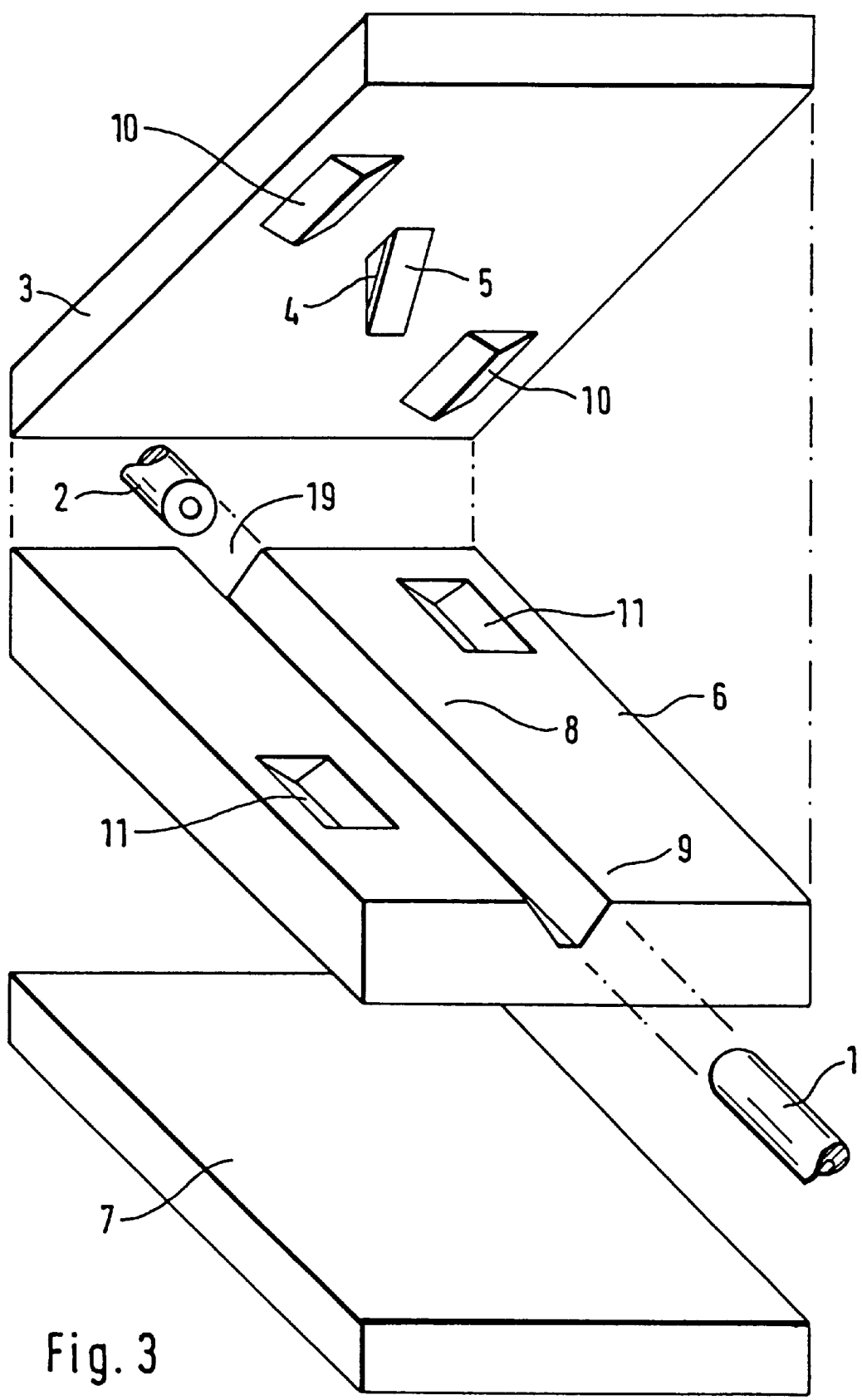
FIG. 3 shows an explosion representation of an exemplary embodiment of an optical, beam-splitting component.

In the explosion representation shown in FIG. 3, the same reference numerals designate the same elements as in FIGS. 1 and 2. Prism carrier plate 3 has the prism member 4 here as well, in the shape of a wedge, on whose inclined plane deflecting layer 5 is applied. In addition, left and right of a trapezoidal-shaped groove 9 for accommodating optical waveguides 1, 2 and prism member 4, two roof-shaped alignment elements 10 are provided. Inverse roof-ridge-shaped counter-alignment elements 11 are configured on optical-waveguide supporting plate 6. Below optical-waveguide supporting plate 6, an optical detector 7 is provided in the region of prism member 4. Instead of a continuous groove 9, a well can also be provided in the region of prism member 4. Groove 9 simultaneously forms the cut-out between optical waveguides 1 and 2.

The arrangement is so dimensioned that, in placing prism carrier plate 3 on optical-waveguide supporting plate 6, in each case alignment elements 10 come to lie over counter-alignment elements 11. Upon inserting optical waveguides 1, 2 into the inverse roof-ridge-shaped alignment groove 9, they are fixed in their position automatically, thus by passive alignment. Prism carrier plate 3 is then put on this arrangement, prism member 4 taking up a space within groove 9. In addition, while assembling, a polymer adhesive which corresponds as exactly as possible in the refractive index to that of prism carrier plate 3 is introduced between prism carrier plate 3 and optical-waveguide supporting plate 6 to avoid a light deflection at the inclined base area.

Figure 4:
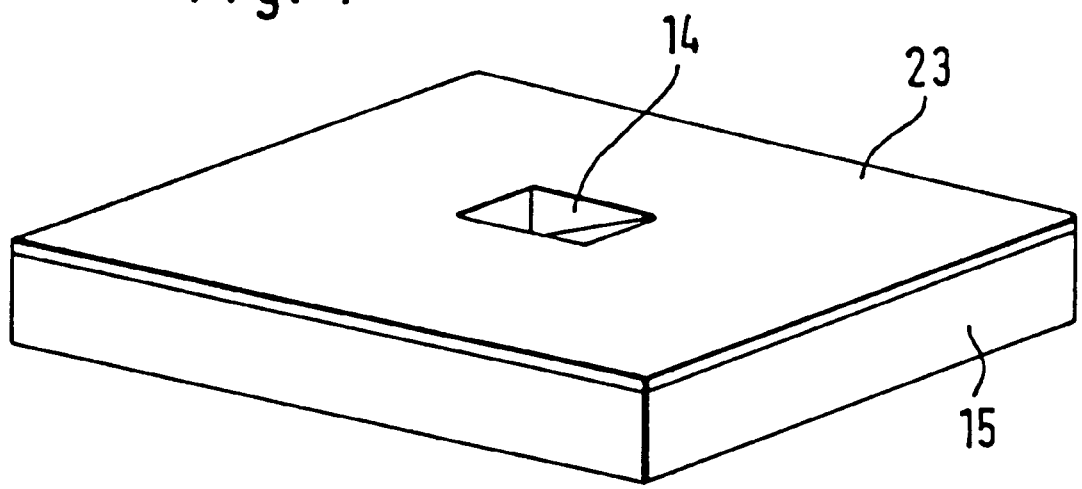
FIG. 4 shows a plate-shaped base having a vapor-deposited metallic layer.

In FIG. 4, a plate-shaped base 15 is shown which has an inverse prism-shaped depression 14. A thin metallic layer 23 has been vapor-deposited on the top side of this plate-shaped base.

Figure 5:
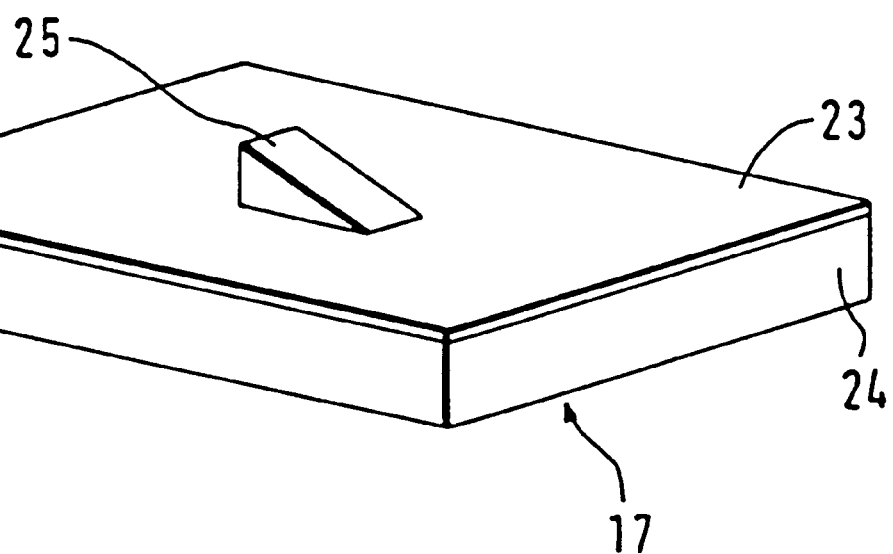
FIG. 5 shows an intermediate auxiliary plate.

In this case, plate-shaped base 15 is used as the first generation for the production of prism carrier plate 3. In a following method step, whose result is shown in FIG. 5, vapor-deposited metallic layer 23 is used to apply an electroplating layer 24. After this step, an intermediate auxiliary plate 17 has been formed. Plate-shaped base 15 can then be dissolved, e.g., in KOH if it consists of silicon, or by pyrolysis if it consists of plastic, for example, PMMA. By way of example, here intermediate auxiliary plate 17 consists purely of metal and, as first generation (formed once), represents a master pattern for the prism carrier plate 3 to be produced. By means of an uneven-numbered generation sequence, a plurality of prism carrier plates 3, whose shape corresponds to intermediate auxiliary plate 17, can now be formed from the intermediate auxiliary plate 17. A semiconductor, preferably silicon, is particularly suitable as material for the plate-shaped base 15, since sufficient knowledge and methods already exist for patterning the surfaces of semiconductors, and using which, the desired patterns, particularly the inverse prism-shaped depression for producing prism member 4, can be produced.

Due to the kind of manufacture using a plurality of generations, the following advantages result: Each generation preceding prism carrier plate 3 permits a material selection requiring no consideration of the optical properties of the material. Only the final shaping of prism carrier plate 3 necessitates that a material having the optical properties necessary for producing the optical, beam-splitting component be used for prism carrier plate 3 itself. Therefore, in doing this, it has proven to be advantageous to use silicon for the master pattern and a metal for the first generation. Metal, in particular nickel, is also suitable as material for the second generation. Furthermore, in this manner of generation-forming, each prism carrier plate 3 does not have to be patterned individually, but rather can be produced in multiple quantity by shaping from a single master pattern, only the master pattern itself having to be patterned with the suitable method. Thus, from one plate-shaped base 15, a plurality of intermediate auxiliary plates 17 can already be produced and, in turn, from each intermediate auxiliary plate 17, a plurality of second generations can be produced from which, in turn, a plurality of prism carrier plates 3 are able to be produced. However, it is advisable not to use too high a generation sequence up to the final production of prism carrier plate 3, since a lowering of the shaping accuracy goes along with the increase in the number of generations. Therefore, the third generation is preferably used as prism carrier plate 3.

Other formations are also provided as the shape for prism member 4, e.g., various polyhedra. Deflecting layer 5 can be so dimensioned that it selectively handles any light-wave ranges desired. In the same way, a plurality of deflecting layers 5, or rather prism members 4, can be arranged one behind the other or side-by-side to allow a plurality of selections.

What is claimed is:

1. An optical beam-splitting component, comprising:
   two optical waveguides carrying light signals, the light signals having a direction of propagation;
   an at least partially transparent deflecting layer inclined toward the direction of propagation of the light signals and arranged between the two optical waveguides;
   a prism carrier plate; and
   a prism member arranged on the prism carrier plate, the prism member being at least partially transparent, having inclined planes, and jutting into a cut-out between the two optical waveguides, the deflecting layer being applied on one of the inclined planes of the prism member.

2. The component according to claim 1, further comprising an at least partially transparent optical-waveguide supporting plate, the optical waveguides being arranged on the supporting plate.

3. The component according to claim 1, further comprising an at least partially transparent optical-waveguide supporting plate, the optical waveguides being arranged at least partially in the supporting plate.

4. The component according to claim 2, wherein the supporting plate has at least one alignment groove for at least partially accommodating at least one of the optical waveguides.

5. The component according to claim 2, wherein the prism carrier plate has at least one alignment element, the at least one alignment element engaging with at least one corresponding counter-alignment element on the supporting plate during placement on the supporting plate.

6. The component according to claim 5, wherein the at least one alignment element has a shape of a roof ridge.

7. The component according to claim 2, further comprising an optical detector arranged in a reflection area of the deflecting layer.

8. The component according to claim 7, wherein the optical detector is arranged on a side of the supporting plate opposite the optical waveguides.

9. A method for producing a prism carrier plate for an optical, beam-splitting component, comprising the steps of:
producing a base having a first substantially planar surface, wherein an inverse-prism-shaped depression is formed in the first substantially planar surface, as a first generation of a shaping; and
producing the prism carrier plate from the base via at least one further shaping.

10. The method according to claim 9, wherein the base is composed of silicon.

11. The method according to claim 9, further comprising the step of producing the depression by anisotropic etching.

12. The method according to claim 9, wherein the prism carrier plate is shaped in a third generation.

13. The method according to claim 9, further comprising the steps of:
producing a metal by electroplating a metallic layer, vapor-deposited on the plate-shaped base, onto the base; and
manufacturing an intermediate auxiliary plate, produced in the first generation, from the metal.

14. The method according to claim 9, wherein the prism-shaped depression includes second and third substantially planar surfaces extending into the base away from the first substantially planar surface, the second and third substantially planar surfaces intersecting at a line.

15. The method according to claim 14, wherein a cross-section of the prism-shaped depression in a plane substantially perpendicular to the first substantially planar surface and substantially perpendicular to the line is triangular.

16. The component according to claim 1, wherein the deflecting layer is so dimensioned that the deflecting layer selectively interacts with different light-wave ranges.

* * * * *